United States Patent [19]
Fukunaga

[11] Patent Number: 5,623,682
[45] Date of Patent: Apr. 22, 1997

[54] APPARATUS FOR PROCESSING DOCUMENTARY INFORMATION

[75] Inventor: Koji Fukunaga, Tokyo, Japan

[73] Assignee: Canon Kabushiki Kaisha, Tokyo, Japan

[21] Appl. No.: 452,865

[22] Filed: May 30, 1995

Related U.S. Application Data

[63] Continuation of Ser. No. 890,137, May 29, 1992, abandoned.

[30] Foreign Application Priority Data

Jul. 9, 1991 [JP] Japan .................... 3-167305

[51] Int. Cl.⁶ .............................. G06F 3/14; G06F 17/21
[52] U.S. Cl. .......................... 395/798; 395/352; 395/353; 400/484
[58] Field of Search ................. 341/22, 23; 364/419.1, 364/419.16, 709.12, 709.13, 709.14, 709.15; 395/144, 145, 146, 148, 150; 400/484

[56] References Cited

U.S. PATENT DOCUMENTS

| | | | |
|---|---|---|---|
| 4,122,533 | 10/1978 | Kubnak | 364/419.09 |
| 4,124,843 | 11/1978 | Bramson et al. | 345/171 |
| 4,185,282 | 1/1980 | Pick | 345/171 |
| 4,204,089 | 5/1980 | Key et al. | 178/30 |
| 4,783,760 | 11/1988 | Carosso | 364/419.17 |
| 4,792,919 | 12/1988 | Fukunaga | 364/419.17 |
| 4,862,410 | 8/1989 | Fukunaga | 395/146 |
| 4,939,639 | 7/1990 | Lee et al. | 395/800 |
| 5,070,456 | 12/1991 | Garneau et al. | 364/419.08 |
| 5,077,669 | 12/1991 | Garneau et al. | 364/419.13 |
| 5,229,936 | 7/1993 | Decker et al. | 364/419.11 |

FOREIGN PATENT DOCUMENTS 62-274360  11/1987  Japan .............. G06F 15/20

OTHER PUBLICATIONS

Kasuga; "Input Device"; Patent Abstracts of Japan; vol. 16, No. 15, p. 1298; Appl: 02-27663; Pub Date: Jan. 14, 1992.

Freeman et al; "Flexible Keyboards"; IBM Technical Disclosure Bulletin; vol. 22, No. 10; Mar. 1980 (pp. 4343-4344).

Magic Print; Lifeboat Assocs.; (Dialog: File 278; Acc #0014300).

Diplomat Software Series; VN Labs; (Dialog: File 256; Acc #00007911).

Multi-Lingual Scholar (MLS); Gamma Productions Inc.; (Dialog: File 237; Acc #00014370).

*Primary Examiner*—Gail O. Hayes
*Assistant Examiner*—Stephen R. Tkacs
*Attorney, Agent, or Firm*—Fitzpatrick, Cella, Harper & Scinto

[57] ABSTRACT

An apparatus for processing document information includes a keyboard, for inputting characters of a plurality of languages, symbols relating to the pronunciation of the inputted characters, a selection key, and a key for inputting a nationality code, and a display for displaying proposed symbols relating to the pronunciation of the inputted characters. A proposed symbol selected to be associated with each input character by pressing the selection key when a cursor on the display is placed on a particular proposed symbol. The apparatus also includes a memory for storing information on different proposed symbols for the plurality of languages so that the proposed symbols can be searched for in the memory by designating one of the plurality of languages, and controller for searching the proposed symbol information stored by the memory for information on proposed symbols in one of the plurality of languages designated by a nationality code previously input. The controller also controls the display to display proposed symbols represented by the searched information and stores accented character codes, each representing an inputted character and a proposed symbol selected to be associated therewith in accordance with the pressing of the selection key in combination with a character input by the keyboard.

29 Claims, 10 Drawing Sheets

NO DISPLAY AND AUTOMATIC SELECTION IN THIS CASE

APPARATUS FOR PROCESSING DOCUMENTARY INFORMATION

This application is a continuation, of application Ser. No. 07/890,137 filed May 29, 1992, now abandoned.

BACKGROUND OF THE INVENTION

1. Field of the Invention

This invention relates to a document information processor such as a word processor or an electronic typewriter and, more particularly, to a document information processor capable of inputting characters to which symbols relating to pronunciation, e.g., accent symbols and phonetic change symbols, are attached (hereinafter referred to as accented characters).

2. Description of the Prior Art

To input such accented characters, conventional document information processors have been designed based on one of the following arrangements:

(a) one in which input keys for inputting accented characters are provided on a keyboard, (b) one in which keys for inputting accent symbols are provided on a keyboard and are operated to add accent symbols to characters, and (c) one in which an input with an accent can be designated by depressing a predetermined key along with a character key, and all proposed accent symbols corresponding to the input character (hereinafter referred to as "proposed accent") are displayed according to the designated input, one of which symbols is selected by the operator.

The need for using a widely used keyboard having no keys for accented characters or accent symbols other than those based on the arrangements (a) and (b) has increased because of the spread of personal computers and because of a need to adapt one keyboard to languages of a plurality of countries. That is, it is highly possible that the arrangement (c) will generally be used.

However, a document information processor adapted to languages of a plurality of countries, e.g., English, French and German, based on the arrangement (c) entails the problems described below.

Proposed accents for inputting an accented character are not selected and displayed in accordance with accented characters of each language; proposed accents are displayed irrespective of the difference between the languages. It is therefore possible that an accented character which does not really exist in an input language can be displayed.

Moreover, conventional processors are not arranged to change in the priority order of selection of proposed accents (the priority order of display) according to the frequency of use.

In addition, there is a need to select and display a plurality of proposed accents even if there is only one accent to be proposed in an input language.

Further, no means for displaying proposed accents while discriminating them with respect to capital and lower case letters is provided in conventional processors.

For these reasons, there is a large burden on the operator who operates the keyboard to select a proposed accent, thereby leading to errors in the inputting operation.

SUMMARY OF THE INVENTION

It is an object of the present invention to provide a document information processor of improved operability for inputting accented characters.

It is another object of the present invention to provide a document information processor to display only proposed accent symbols which exist in an input language.

It is still a further object of the present invention to provide a document information processor in which the priority order of proposed accent symbols reflects the frequency of use of those accent symbols in each language.

It is still another object of the present invention to provide a document information processor in which there is no need to select and display a proposed accent symbol if only one accent symbol is associated with a particular character in a particular language.

It is still another object of the present invention to provide a document information processor in which proposed accent symbols for capital and lower case letters are discriminated and appropriately displayed.

It is another object of the present invention to provide a document information processor which reduces the burden on the operator of selecting a proposed symbol by displaying only proposed symbols for each language that are found in that language, while inhibiting the display of the proposed symbols which are not used in that language.

According to one aspect, the present invention which achieves these objectives relates to an apparatus for processing document information comprising operating input means for inputting characters of a plurality of languages, symbols relating to pronunciation of the inputted characters and associated with the input characters, a predetermined operating input, and a nationality code, display means for displaying proposed symbols relating to pronunciation of the inputted characters, a proposed symbol being selected to be associated with each input character in accordance with the inputting of the predetermined operating input in combination with a character input provided by the operation of the operating input means, memory means for storing information on different proposed symbols for the plurality of languages so that the proposed symbols can be searched for in the memory means by designating one of the plurality of languages, and control means for searching the proposed symbol information stored by the memory means for information on proposed symbol's in one of the plurality of languages designated by a nationality code previously input by the operating input means, for controlling the display means to display proposed symbols represented by the searched information, and for storing accented character codes, each representing an inputted character and a proposed symbol selected to be associated therewith in accordance with the inputting of the predetermined operating input in combination with a character input by the operating input means.

The proposed symbols for each character in one of the plurality of languages are displayed in a priority order. Moreover, the apparatus further comprises means for changing this priority order.

The control means automatically stores an accented character code representing an inputted character and a proposed symbol if only one proposed symbol is found by the control means when searching the proposed symbol information stored by the memory means for information on proposed symbols in one of the plurality of languages for the inputted character.

The memory means stores, as the information on the proposed symbols, information on proposed symbols to be annexed to capital letters and information on proposed symbols to be annexed to lower case letters.

According to another aspect, the present invention which achieves these objectives relates to an apparatus for processing document information comprising operating input means having at least alphabetical character input keys for inputting alphabetical characters and a selection key for inputting and selecting one of a plurality of predetermined symbols to associate one of the plurality of predetermined symbols with one of the alphabetical characters, memory means for storing information on different proposed symbols for a plurality of languages and for a plurality of alphabetical characters, display means for displaying the information on proposed symbols stored by the memory means, and control means for controlling the display means to display different proposed symbols for an alphabetical character, and to display the alphabetical character and one of the different proposed symbols together, in response to an operator operating the selection key to select one of the different proposed symbols of the plurality of predetermined symbols to be associated with the alphabetical character.

The memory means stores the information on the different proposed symbols together with information on the number of the different proposed symbols for each alphabetical character in each language.

The information on the different proposed symbols stored by the memory means comprises at least one of information on an accent symbol annexed to an alphabetical character and information on an accent symbol alone.

DESCRIPTION OF THE PREFERRED EMBODIMENT

An embodiment of the present invention will be described below with reference to the accompanying drawings. In this embodiment, the present invention is applied to a word processor adapted to process data in languages of a plurality of European countries such as French, German and other languages. This word processor is arranged to designate an input with an accent by a predetermined key input operation and to display proposed accents in accordance with this designated input. An operator selects one of the proposed accents to input an accented character.

Figure 1:
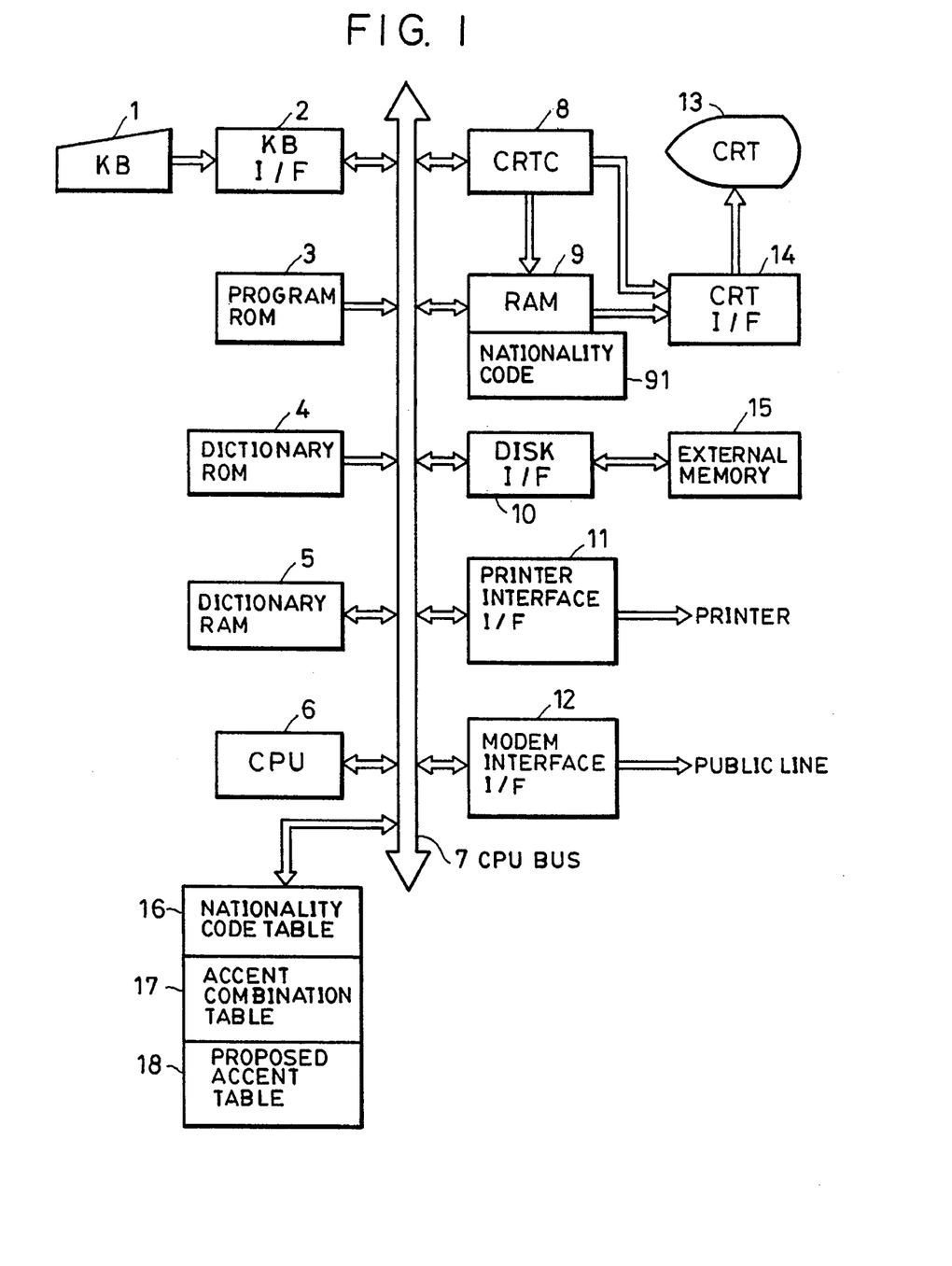
FIG. 1 is a schematic block diagram of the construction of a European-language word processor in accordance with an embodiment of the present invention.

FIG. 1 is a schematic diagram of the construction of a system for overall control of the word processor in accordance with this embodiment. Components of this system will be described below.

Figure 2:
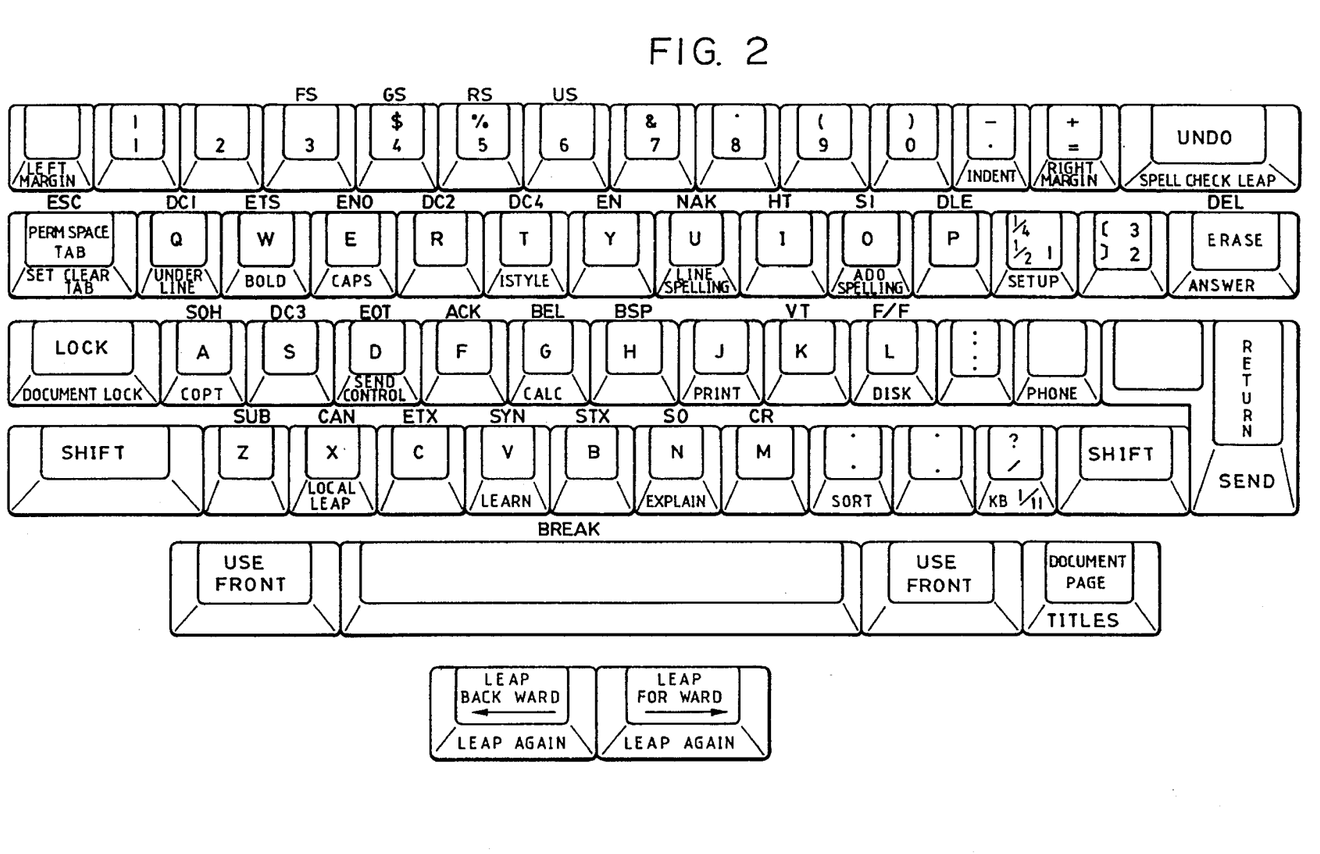
FIG. 2 is a diagram of an example of a keyboard arrangement in accordance with the embodiment shown in FIG. 1.

A block 1 shown in FIG. 1 is a keyboard (KB) in which character (alphabet) keys, numeral keys, symbol keys and various function keys are arranged as shown in FIG. 2.

A key code is input from the keyboard 1 to a keyboard interface 2 (KB I/F) and is supplied to a central processing unit (CPU) bus 7.

A program read only memory (ROM) 3 stores a control program for a central processing unit (CPU) 6 and various data items.

A dictionary read only memory (ROM) 4 stores a word dictionary for checking the spelling of document information.

A word dictionary registration random access memory (RAM) 5 is used by the user to register a sequence of characters, such as one representing a person's name, which may be checked for a misspelling.

The CPU 6 executes various kinds of processing in accordance with the control program stored in the program ROM 3 to control the entire system of the word processor.

The CPU bus 7 includes an address bus, data bus and a control bus.

A cathode ray tube (CRT) controller 8 controls the operation of displaying data with a cathode ray tube (CRT) 13. The CRT controller 8 displays, on the CRT 13, bit-map data from a random access memory (RAM) 9 in accordance with a command from the CPU 6.

The RAM 9 stores document information input through the keyboard 1 and stores display information displayed on the CRT 13. A nationality code indicating the nationality of each of the languages of words input by the operator is stored at a predetermined address 91 of the RAM 9. Each nationality code is input by a key input through the keyboard 1 in accordance a predetermined procedure and is stored at the address 91.

The CRT 13 of a display unit is controlled by the CRT controller 8 through a cathode ray tube (CRT) interface (I/F) 14 to display information from the RAM 9.

An external memory 15 which comprises a hard disk unit or a floppy disk unit serves to write document information input through a disk interface (I/F) 10 on a disk and to read out document information from the disk in accordance with a command from the CPU 6.

A printer interface (I/F) 11 controls data exchange between an unillustrated printer and the CPU bus 7.

A modem interface (I/F) 12 serves to transmit information through a public line and to receive information by modulating information signals.

Memories 16 to 18 are read only memories (ROM) specially used in this embodiment in conjunction with the nationality code address 91 of the RAM 9. The memories 16, 17, and 18 respectively store a nationality code table, an accent combination table, and a proposed accent table shown in FIG. 3.

Figure 3:
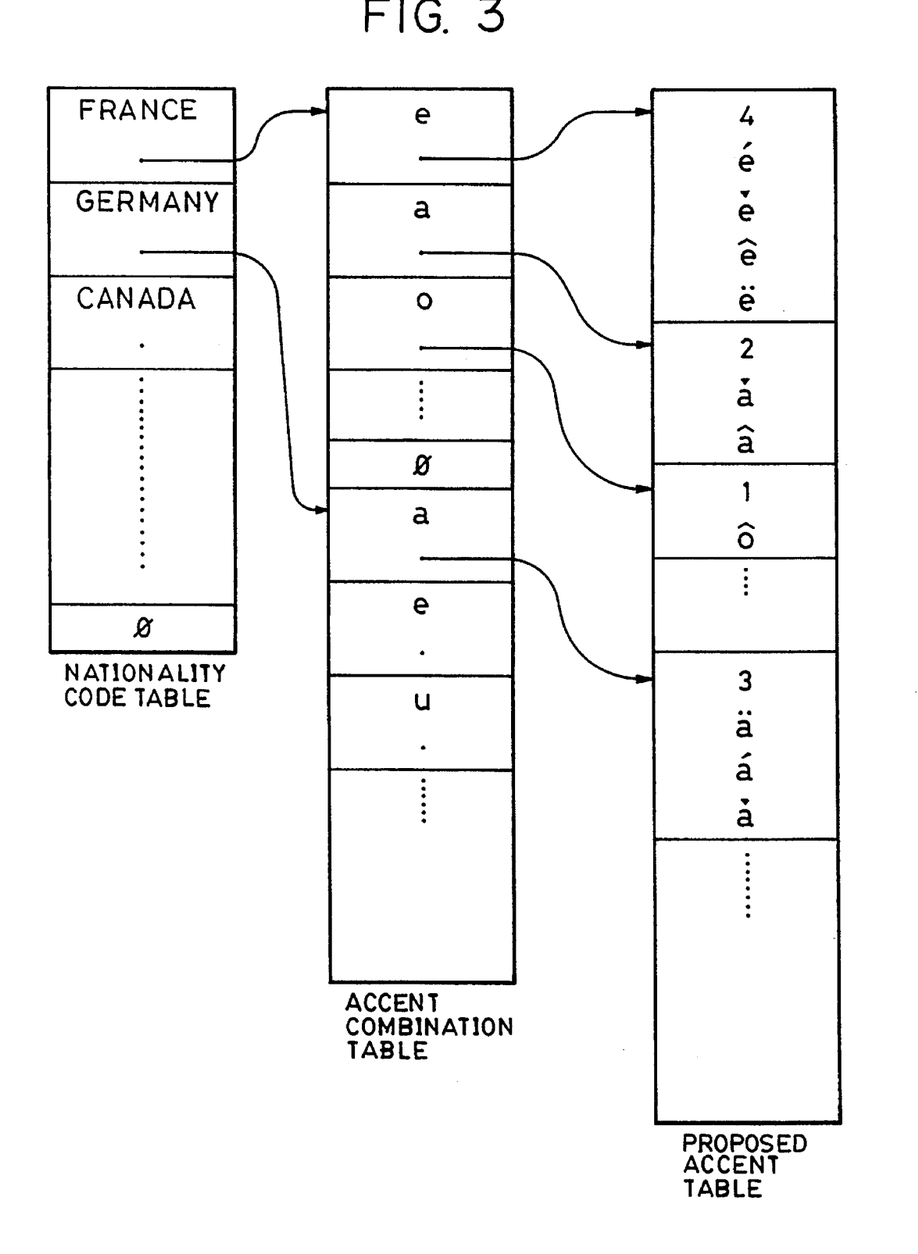
FIG. 3 is a diagram of the contents of a nationality code table, an accent combination table and a proposed accent table stored in memories 16 to 18 shown in FIG. 1.

The nationality code table is a table of information necessary for searching the accent combination table based on each nationality code. More specifically, the nationality code table is a table containing nationality codes of languages requiring accents and pointer data indicating addresses of character codes representing characters in the languages in the accent combination table corresponding to the nationality codes.

The accent combination table is a table of information necessary for searching the proposed accent table based on a character code for a character of each language with which an accent can be combined (to which an accent can be added). More specifically, the accent combination table is a table in which codes for characters to which accent symbols are annexed and pointer data indicating addresses of proposed accent areas in the proposed accent table corresponding to these character codes are arranged with respect to nationality. The last one of the codes for characters of each language to which accent symbols are annexed is "0", which indicates that there are no more codes for characters to which accent symbols are annexed.

The proposed accent table is a table of code data of proposed accent symbols which can be annexed to characters of each language (, which data is illustrated as accented characters). In this table, data on the number of proposed accent symbols which can be annexed to one character is also stored as indicated by numerals in FIG. 3.

Data on proposed accents for each language is stored together and is classified with respect to the languages, as can be understood from second and fifth upper sections of the proposed accent table, i.e., data representing proposed accents to be added to "a" in French and German. In the illustrated table, the order of proposed accent data from the top to the bottom corresponds to the order of the addresses of the corresponding data in the memory 18. The proposed accents are displayed in the same order, and this order also corresponds to the selection priority order as described later. For example, proposed accents for "a" in French and German are different from each other and the priority orders of proposed accents of these languages are also different.

Proposed accents are displayed by using data of the above-described proposed accent data when an accented character is input. Then, one of the proposed accents selected by the operator is input via the keyboard 1. The operation of displaying proposed accents when an accented character is input will be described below with reference to FIGS. 4 to 8.

Figure 4:
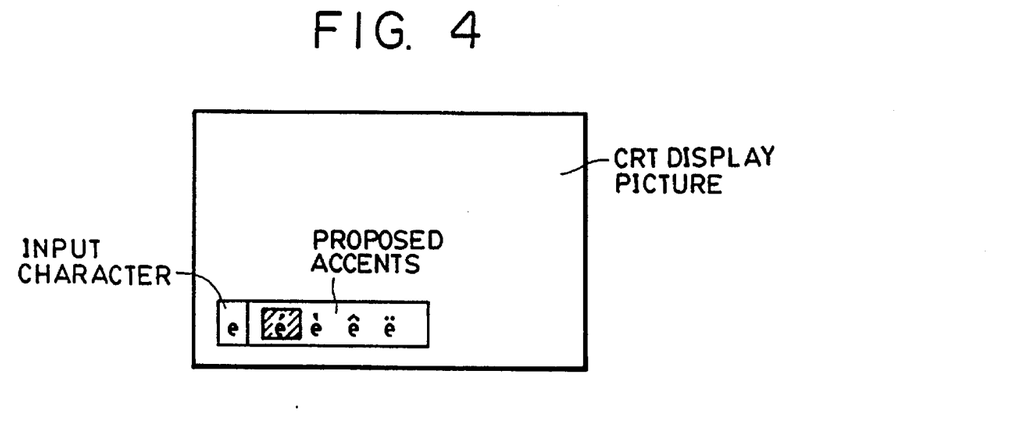
FIG. 4 is a diagram of a display state of proposed accents on CRT 13 when an accented character is input in accordance with the embodiment shown in FIG. 1.
Figure 5A:
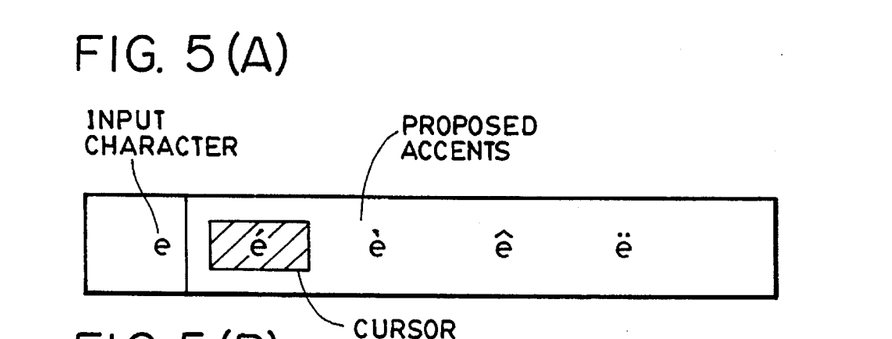
FIGS. 5(A), 5(B) and 5(C) are diagrams of the display of proposed accents on CRT 13.
Figure 5B:
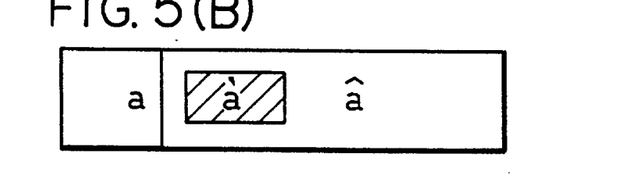

FIG. 4 is an illustration of an example of a group of proposed accents displayed on the display screen of the CRT 13, showing a state of display of proposed accents when a character "e" in French is input with an accent. As illustrated, the input character and proposed accents for this character (four accents in this example) are displayed in a lower portion of the display screen. FIG. 5(A) is an enlarged diagram of the display portion on which the proposed accents are displayed. FIG. 5(B) shows a display portion on which proposed accents are displayed when a character "a" in French is input with an accent.

Each of these displays is made in such a manner that the data on "e" in the top section of or on "a" in the second section of the proposed accent table shown in FIG. 3 is successively displayed from left to right in the order of addresses of the table. When the proposed accents are displayed in this manner, the operator operates the keyboard 1 to move a cursor indicated by hatching in FIGS. 5A–5(C) to the position of one of the proposed accents which is to be input, and depresses a selection key, thereby selecting and inputting the proposed accent corresponding to the cursor position.

In an initial state of the proposed accent display, the cursor is positioned on the proposed accent at the left end, as shown in FIG. 5(A) or 5(B). That is, a proposed accent in a position closer to the left end among a plurality of proposed accents displayed is higher in priority order. This priority order is determined according to the frequency of general use (in a grammatical system) in each language.

Figure 5C:
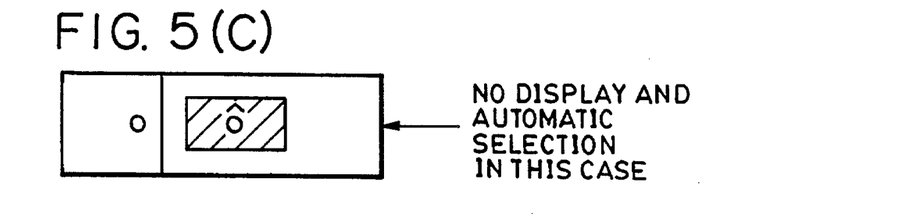
Figure 6:
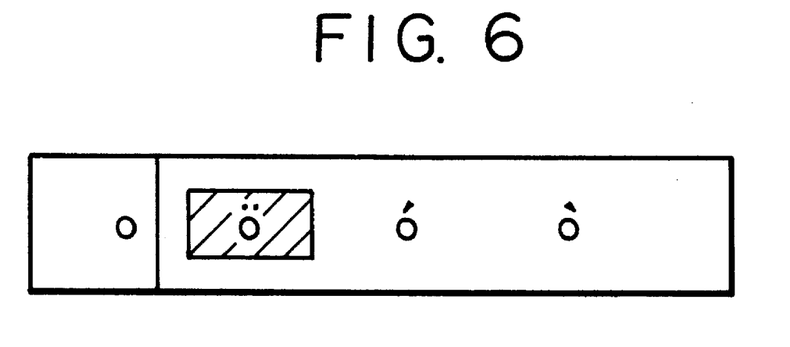
FIG. 6 is a diagram of another example of the display of proposed accents on CRT 13.

In the case of inputting "o" with an accent in German, there are three proposed accents as shown in FIG. 6. In the case of inputting the same character in French, there is only one proposed accent as shown in the third section of the proposed accent table of FIG. 3. In this case, there is no need to display only one proposed accent as shown FIG. 5(C) and to make the operator perform the selecting operation, since there is no opportunity for selection. In this embodiment, therefore, a display such as that shown in FIG. 5(C) is not effected and the proposed accent is automatically selected and input without the operator's selecting operation.

Figure 7:
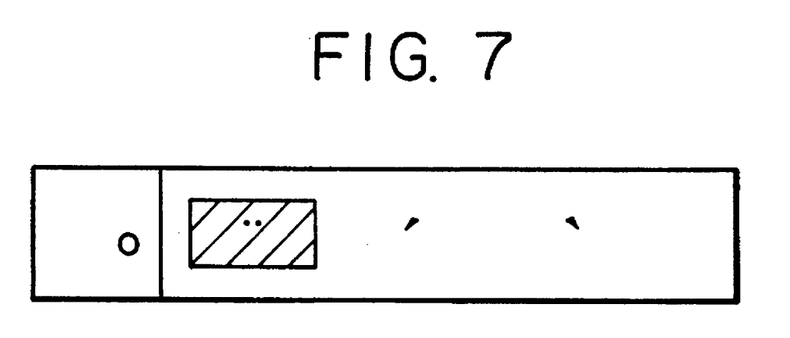
FIG. 7 is a diagram of another example of the display of proposed accents on CRT 13.

In the above-described example, proposed accents are displayed in a form such that an accent symbol is annexed to an input character i.e. so that the accent symbol is placed in the conventional or normal position with respect to the input characters so that one of ordinary skill on phonetics will understand how to pronounce the input character. However, a display of the proposed symbol alone as shown in FIG. 7 may suffice.

Figure 8:
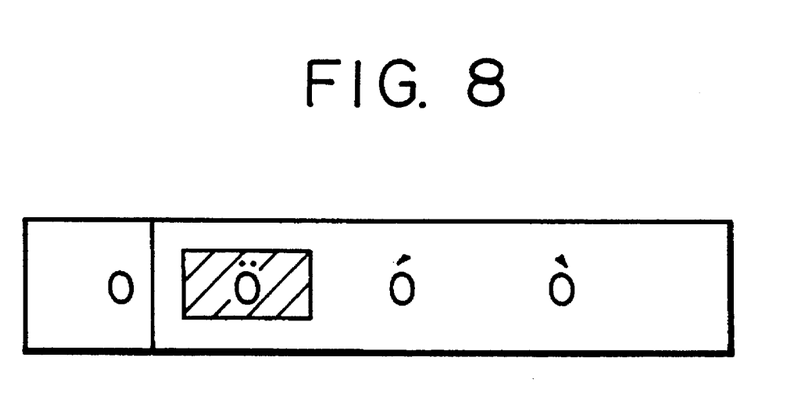
FIG. 8 is a diagram of another example of the display of proposed accents on CRT 13.

In this embodiment, proposed accents are also displayed and selected when the input character is a capital letter as shown in FIG. 8 (in this case, "O"). Capital and lower case letters have accent symbols placed at different positions and are represented by different character codes. Data for both capital and lower case letters is provided in the proposed accent table of FIG. 3, i.e., stored in the memory 18.

The operation of the CPU 6 in performing a process including displaying and selecting proposed accents in the above-described manner when a character with an accent is input will be described below in detail with reference to the flowcharts of FIGS. 9 to 13. The process described below is executed in accordance with the control program stored in the program ROM 3.

Figure 9:
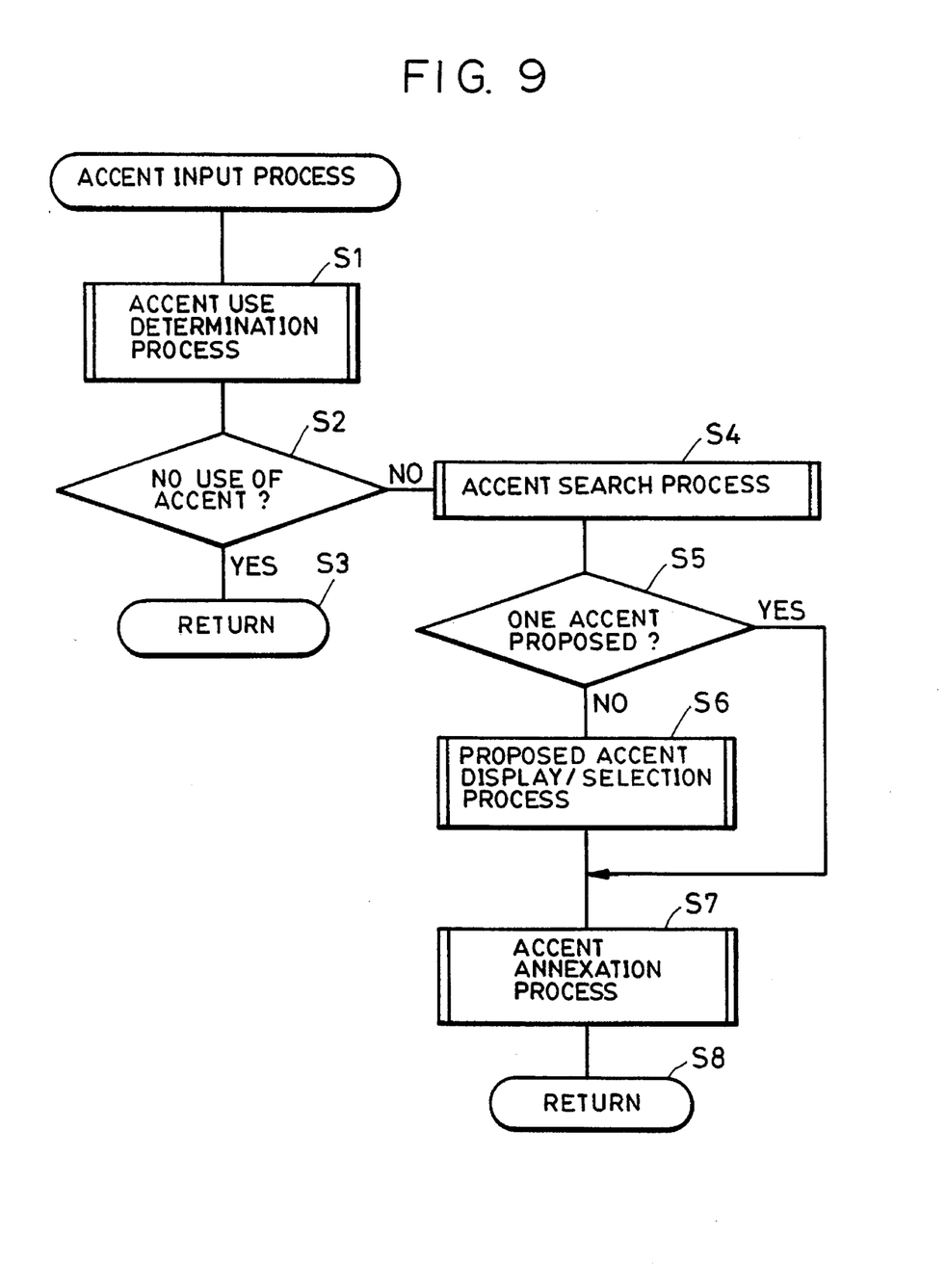
FIG. 9 is a flowchart of an accented character input process conducted by a CPU, CPU 6, for example, in accordance with an embodiment of the present invention.

FIG. 9 shows a main routine of the accented character input process. When an input of an accent is designated by depressing a predetermined key of the keyboard 1 along with a character key, the CPU 6 starts the process shown in FIG. 9 and first executes an accent use determination process (step S1) for determining whether or not some accent symbol will be used (available or unavailable) with respect to the input character. This process will be described later in detail.

Next, it is determined based on the result of the above determination process that some accent symbol will be used or no accent symbol will be used (step S2). If no accent symbol will be used, the process returns from the accented character input process to the key input processing main routine (step S3).

If some accent will be used, an accent search process (step S4) is conducted. In the accent search process, the accent combination table of FIG. 3 is searched, as is the proposed accent table for proposed accents corresponding to the input character. Details of this process will be described later.

In step S5, it is determined from data of the proposed accent table that the number of proposed accents is one or more than one. If there is only one proposed accent, the process skips over step S6 to step S7 to conduct an accent annexation process in which an accented character consisting of the input character and an accent symbol annexed to the input character is input. The process thereafter returns to the main routine in steps S8. Details of this accent annexation process will also be described later.

If it is determined in step S5 that the number of proposed accents is two or more, the process proceeds to step S6 to conduct a process of displaying proposed accents and selecting one of the proposed accents as shown in FIGS. 4 to 8. Details of this process will also be described later. The process then proceeds to step S7 to conduct the accent annexation process and thereafter returns to the key input processing main routine.

Figure 10:
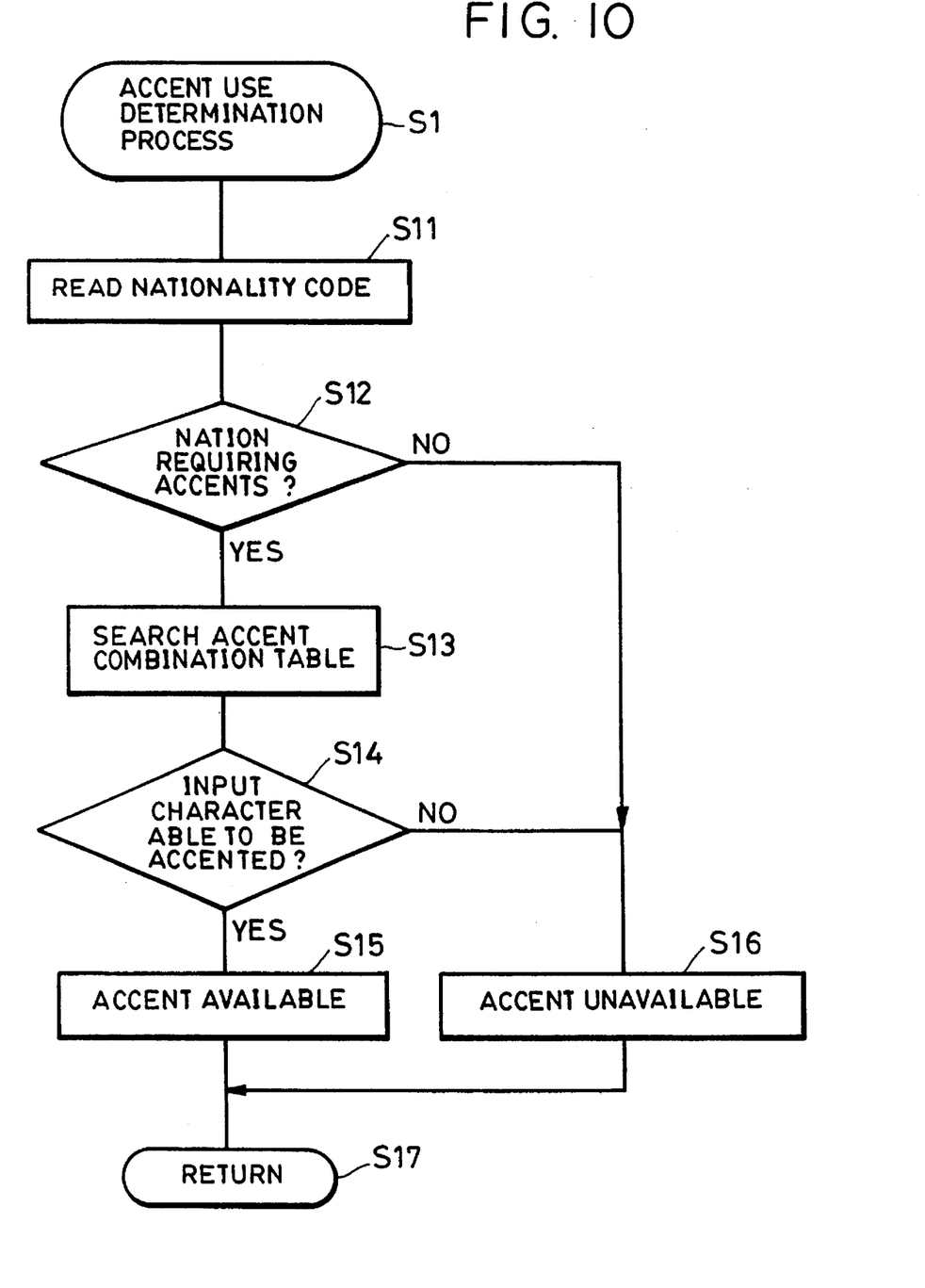
FIG. 10 is a flowchart of details of an accent use determination process shown in FIG. 9.

FIG. 10 shows details of the accent use determination process in step S1 shown in FIG. 9, which will now be described below. In this process, a nationality code is read from the address 91 of the RAM 9 shown in FIG. 1 (step S11).

In step S12, a determination is made by CPU 6 as to whether or not the same nationality code as the read nationality code exists in the nationality code table shown in FIG. 3, that is, a determination is made as to whether an accent will be annexed to the character of the language indicated by the nationality code. If there is no such nationality code, in the nationality code table shown in FIG. 3, thereby indicating that no accent is required by this language for this character, the process proceeds to step S16 to determine that no accent will be used.

If the read nationality code exists in the nationality code table, the process proceeds to step S13 to search the area of the accent combination table corresponding to the nationality code. In step S14, a determination is made by CPU 6 as to whether there is any character code coinciding with the input character in the searched area, that is, the input character can be accented.

If a character code coinciding with the input character exists in the table, the process proceeds to step S15 to determine that some accent will be be used. If there is no matching code, the process proceeds to step S16 to determine that no accent will be used.

After steps S15 or S16, the process returns in step S17 to the routine shown in FIG. 9, and proceeds to step S2 of this routine.

Figure 11:
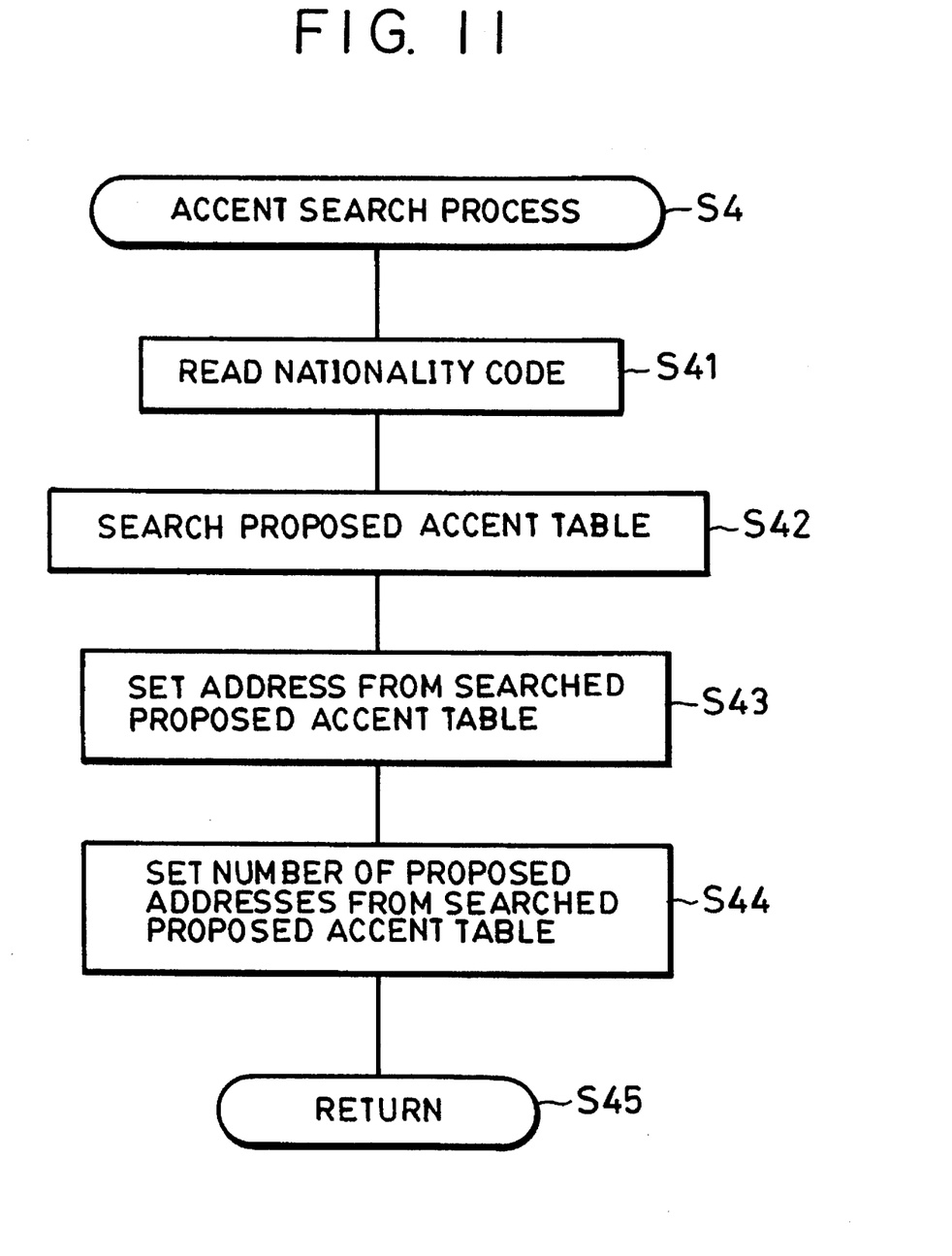
FIG. 11 is a flowchart of details of an accent search process shown in FIG. 9.

Details of the accent search process in step S4 shown in FIG. 9 will be described below with reference to FIG. 11. In this process, a nationality code is first read from the address 91 of the RAM 9 (Step S41).

Next, the proposed accent table is searched through the nationality code table and the accent combination table for the address of proposed accent data and the number of proposed accents corresponding to the read nationality code and the input character (step S42). The address and the number of accents thereby searched are set in a predetermined register (in CPU 6 or RAM 9) (steps S43, S44).

The table address and the number of proposed accents having been obtained in this manner, the process proceeds to step S45 to return to the routine of FIG. 9 and proceeds to step S5 of this routine.

Figure 12:
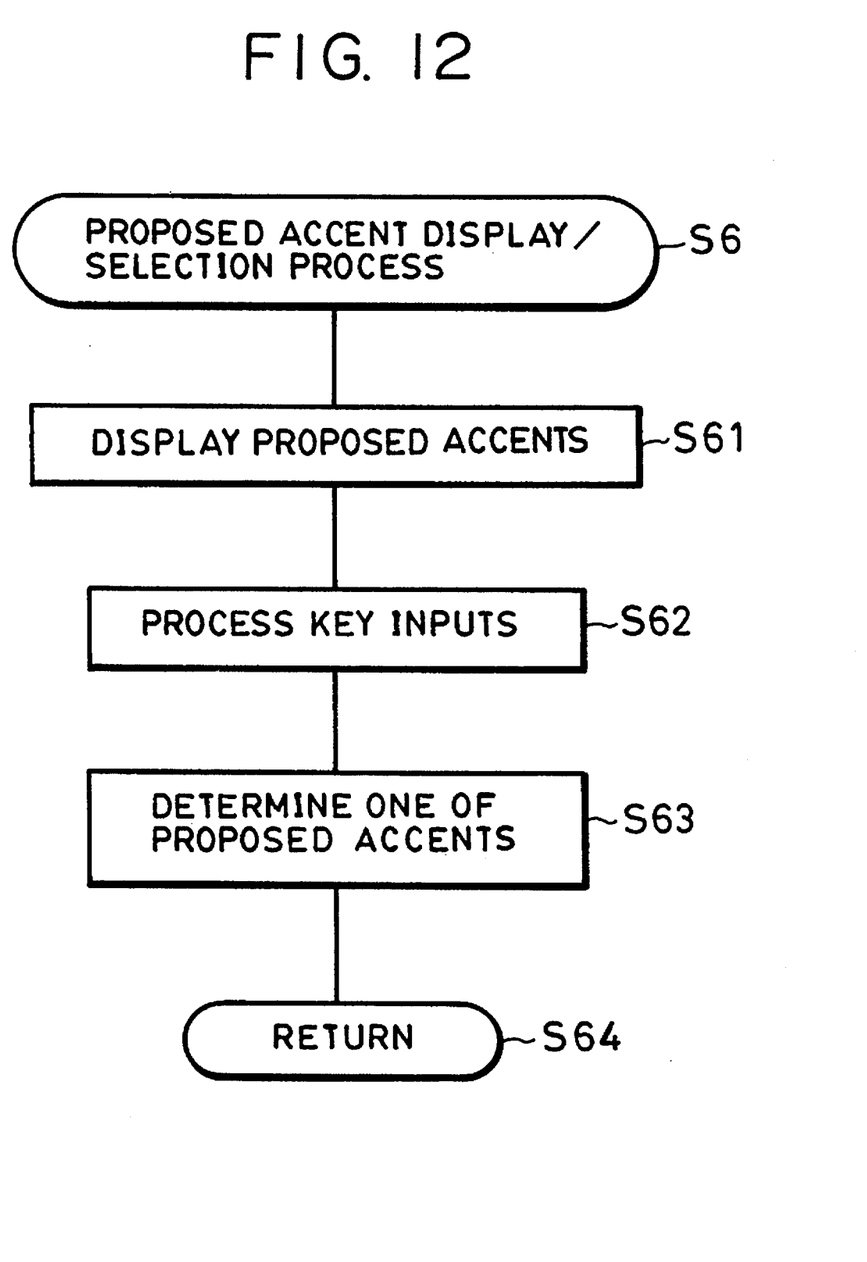
FIG. 12 is a flowchart of details of a proposed accent display/selection process shown in FIG. 9.

Details of the proposed accent display/selection process in step S6 shown in FIG. 9 will be described below with reference to FIG. 12. In this process, proposed accents are first displayed (step S61). In this event, data on proposed accents is read from the address of the proposed accent table obtained by the above-described accent search process and is displayed as described above with reference to FIGS. 4 to 8.

Next, the process proceeds to a key input step 62 in which the operator operates the cursor moving key and the selection key to select one of the proposed accents. One of the proposed accents selected is determined by the CPU 6 according to this key input (step S63). That is, the operator moves the cursor to the position of a desired one of the proposed accents and presses the selection key to select and determine the proposed accent in the corresponding position. The above-mentioned key input step includes processing based on a key input which determines that the selection of proposed accents is ineffective.

The process then proceeds to step S64 to return to the routine of FIG. 9, and proceeds to step S7 of this routine. In this manner, one proposed accent is selected from a plurality of proposed accents.

Figure 13:
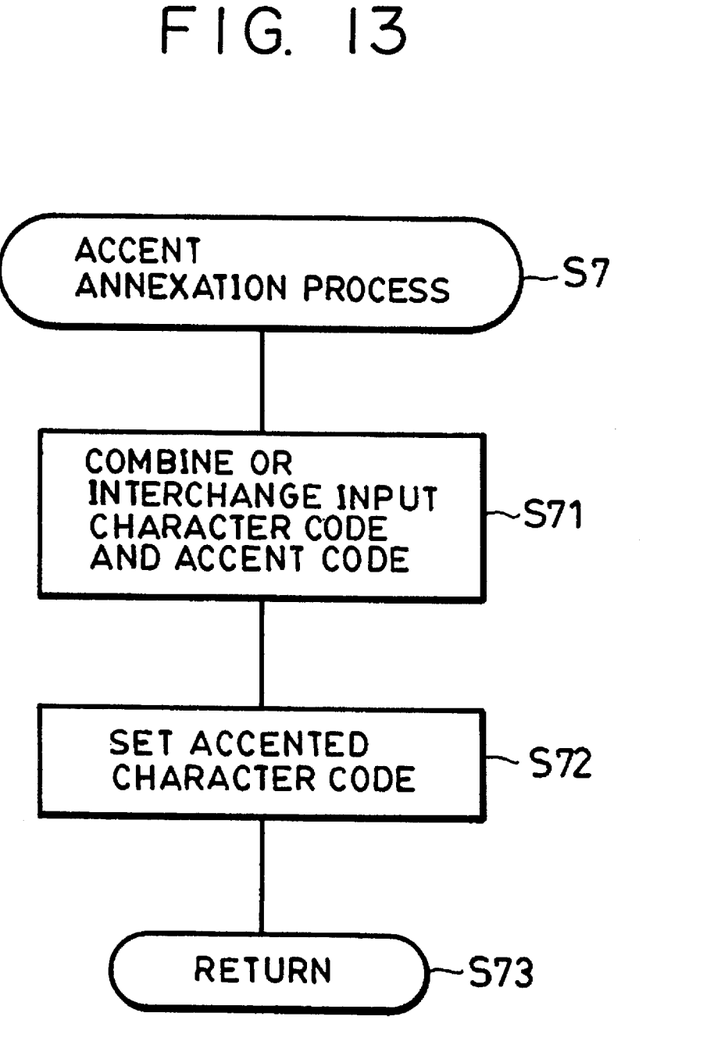
FIG. 13 is a flowchart of details of an accent annexation process shown in FIG. 9.

Details of the accent annexation process in step S7 shown in FIG. 9 will be described below with reference to FIG. 13. In this process, a code for an accented character is first formed from the input character code and the accent code (step S71). In this step, combining the input character and the accent code to form an accented character or substituting an accented character may be performed.

The accented character code formed in step S71 is set by being stored as an input character in a document information buffer in the RAM 9 (step S72).

The process then proceeds to step S73 to return to the key input processing main routine. In this manner, the code for an accented character is set as document information.

In the embodiment described above, at the time of proposed accent display for inputting an accented character, only necessary proposed accents specified by a nationality code in accordance with each language are displayed without the display of unnecessary proposed accents as in the conventional apparatus. It is thereby possible to reduce the burden on the operator at the time of selection of one of the proposed accents and to improve the operation facility thereof.

When proposed accents are displayed, they are displayed in priority order in accordance with the frequency of use which is different for each language. The burden on the operator can also be reduced in this respect.

If there is only one proposed accent, the proposed accent is automatically selected without being displayed, so that the need for an unnecessary operation can be eliminated. The burden on the operator can also be reduced in this respect.

Further, in the above-described embodiment, proposed accents can be changed according to whether the input character is a capital or lower case letter; proposed accents to be displayed are finely grouped. The operation facility of the apparatus can also be improved in this respect.

The priority order in which proposed accents are displayed is not always determined in accordance with the frequency of general use (in a grammatical system); it may be changed according to other purposes or may be variably set according to the frequency of actual use.

As described above, the present invention is applied to a document information processor which is capable of inputting characters of languages of a plurality of countries by an operating input means, and which is arranged to display, by a display means, proposed symbols such as accent symbols relating to pronunciation and selected to be annexed to each input character in accordance with a predetermined operating input provided in combination with a character input, and to input a character formed by annexing to each input character a code for one of the proposed accents selected by the operating input. The document information processor of this type in accordance with the present invention has a memory means for storing information on different proposed symbols with respect to the languages of the plurality of countries so that some proposed symbols can be searched for with respect to each language, and a control means for searching the proposed symbol information stored by the memory means for information on proposed symbols in the language designated by a nationality code previously input by the operating input means, and for making the display means display the information thereby searched. According to this arrangement, only information on necessary proposed symbols with respect to each language is displayed at the time of proposed symbol display. The burden on the operator who selects one of the proposed symbols can therefore be reduced and the operation facility of the apparatus can be improved.

The individual components represented by the blocks shown in FIGS. 1 and 3 are well-known in the document information processing art and their specific construction and operation is not critical to the invention or the best mode for carrying out the invention. Moreover, the steps illustrated in FIGS. 9 through 13 can be easily programmed into well-known central processing units by persons of ordinary sill in the art and since such programming, per se, is not part of the invention, no further description thereof is deemed necessary.

What is claimed is:

1. An apparatus for processing document information comprising:

operating input means for inputting characters of a plurality of languages, symbols relating to pronunciation of the inputted characters and associated with the input characters, selecting data, and a nationality code;

display means for displaying proposed symbols relating to pronunciation of the inputted characters and wherein a proposed symbol is selected to be associated with each input character in accordance with the inputting of the selecting data in combination with a character input provided by the operation of said operating input means;

memory means for storing information comprising a nationality code table, an accent combination table, and a proposed accent table, wherein the nationality code table stores nationality codes of different languages, wherein the accent combination table stores character codes of different languages corresponding to different nationality codes stored in the nationality code table, and wherein the proposed accent table stores code data of proposed symbols to be annexed to characters in each language, the code of which is stored in the nationality code table, so that the proposed symbols can be searched for in said memory means by designating one of the plurality of languages with a nationality code and an input character; and control means for searching the nationality code table for the nationality code input by said operating input means, for searching the accent combination table for a character code corresponding to an input character in the language corresponding to the input nationality code, and for searching the proposed accent table for information on proposed symbols for the input character in the language corresponding to the input nationality code previously input by said operating input means, for controlling said display means to display proposed symbols represented by the searched information, and for storing accented character codes, each representing an inputted character and a proposed symbol selected to be associated therewith in accordance with the inputting of the selecting data in combination with a character input by said operating input means.

2. An apparatus according to claim 1, wherein said control means automatically stores an accented character code representing an inputted character and a proposed symbol if only one proposed symbol is found by said control means when searching the proposed symbol information stored by said memory means for information on proposed symbols in one of the plurality of languages for the inputted character.

3. An apparatus according to claim 2, wherein said memory means stores, as the information on the proposed symbols, information on proposed symbols to be annexed to capital letters and information on proposed symbols to be annexed to lower case letters.

4. An apparatus according to claim 1, wherein said memory means stores, as the information on the proposed symbols, information on proposed symbols to be annexed to capital letters and information on proposed symbols to be annexed to lower case letters.

5. An apparatus according to claim 1, wherein the proposed symbols for each character in one of the plurality of languages are displayed in a priority order, wherein said apparatus further comprises means for changing the priority order.

6. An apparatus according to claim 5, wherein said memory means stores, as the information on the proposed symbols, information on proposed symbols to be annexed to capital letters and information on proposed symbols to be annexed to small letters.

7. An apparatus according to claim 5, wherein said control means automatically stores an accented character code representing an inputted character and a proposed symbol if only one proposed symbol is found by said control means when searching the proposed symbol information stored by said memory means for information on proposed symbols in one of the plurality of languages for the inputted character.

8. An apparatus according to claim 7, wherein said memory means stores, as the information on the proposed symbols, information on proposed symbols to be annexed to capital letters and information on proposed symbols to be annexed to small letters.

9. An apparatus for processing document information comprising:

operating input means having at least alphabetical character input keys for inputting alphabetical characters and a selection key for inputting and selecting one of a plurality of predetermined proposed symbols relating to the pronunciation of the input alphabetical characters to associate one of the plurality of predetermined symbols with one of the alphabetical characters;

memory means for storing information comprising a nationality code table, an accent combination table, and a proposed accent table, wherein the nationality code table stores nationality codes of different languages, wherein the accent combination table stores character codes of different languages corresponding to different nationality codes stored in the nationality code table, and wherein the proposed accent table stores code data of proposed symbols to be annexed to alphabetical characters in each language, the code of which is stored in the nationality code table;

display means for displaying the information on proposed symbols corresponding to code data stored by the proposed accent table; and control means for controlling said display means to display proposed symbols corresponding to code data stored in the proposed accent table for an alphabetical character input by said operating input means in a particular language whose code is stored in the nationality code table, and to display the input alphabetical character and one of the proposed symbols together, in response to an operator operating said selection key to select one of the proposed symbols of the plurality of predetermined symbols to be associated with the alphabetical character.

10. An apparatus according to claim 9, wherein said memory means stores the information on the proposed symbols together with information on the number of the proposed symbols for each alphabetical character in each language.

11. An apparatus according to claim 10, wherein the information on the proposed symbols stored by said memory means comprises at least one of information on an accent symbol annexed to an alphabetical character and information on an accent symbol alone.

12. An apparatus according to claim 9, wherein the information on the proposed symbols stored by said memory means comprises at least one of information on an accent symbol annexed to an alphabetical character and information on an accent symbol alone.

13. An information processing apparatus comprising:

input means for inputting characters of languages of a plurality of countries and accent symbols;

display means for displaying the input characters input by said input means and proposed accent symbols;

symbol memory means for storing information representing proposed accent symbols of languages of a plurality of countries to be displayed by said display means, said symbol memory means comprising a proposed accent table;

determining means for determining the countries whose languages the input characters belong to so as to permit the display of proposed accent symbols of a language of a country whose language the input characters belong to, said determining means comprising a nationality code table storing nationality codes of different languages and an accent combination table storing character codes of different languages corresponding to the different nationality codes stored in the nationality code table;

display control means for controlling said display means to display proposed accent symbols for each character after searching the nationality code table for a nationality code of the language to which the input character belongs, after searching the accent combination table for a character code of the language corresponding to the searched nationality code, and after searching the proposed accent table for proposed accent symbols corresponding to the searched character code in the accent combination table, the proposed accent symbols for one character relating to a language of a country whose language the one character belongs to as determined by said determining means; and instruction means for instructing the selections of a proposed accent symbol for each character from the proposed accent symbols displayed by said display means.

14. An information processing apparatus according to claim 13, wherein said display control means comprises means for controlling said display means to display the proposed symbols simultaneously.

15. An information processing apparatus according to claim 13, wherein said display control means comprises means for combining an input character and a selected proposed accent symbol to form an accented character and for controlling said display means to display the accented character.

16. An information processing apparatus according to claim 13, wherein said apparatus further comprises means for combining an input character and a selected proposed accent symbol to form accented characters.

17. An information processing apparatus according to claim 13, wherein said apparatus further comprises country memory means for storing information relating to the countries whose languages the input characters belong to.

18. An information processing apparatus comprising:

input means for inputting characters of languages of a plurality of countries, accent symbols, and a nationality code;

symbol memory means for storing information representing a plurality of accent symbols;

character memory means for storing the characters input by said input means;

display means for displaying the characters stored by said character memory means and the plurality of accent symbols;

display control means for controlling said display means to display the plurality of accent symbols simultaneously in a priority order from left to right, determined according to the frequency of use, in the language corresponding to the input nationality code so as to permit the selecting of one accent symbol for each character and the subsequent combining of accent symbols and characters input by said input means;

instruction means for instructing the selection of the accent symbols for the input characters from the accent symbols displayed by said display means; and means for combining the input characters and the selected accent symbols to form accented characters on the basis of the instructing by said instruction means and for storing the accented characters in said character memory means.

19. An information processing apparatus according to claim 18, wherein said apparatus further comprises means for displaying the accented characters formed by said combining means.

20. An information processing apparatus according to claim 18, wherein said symbol memory means stores accent symbols for a plurality of languages of a plurality of countries.

21. An information processing apparatus comprising:

a keyboard for inputting characters of languages of a plurality of countries, accent symbols, and a nationality code;

symbol memory means for storing information relating to a plurality of accent symbols;

text memory means for storing characters input by said input means;

display means for displaying the characters stored in said text memory means and the plurality of accent symbols stored in said symbol memory means;

display control means for controlling said display means to display the plurality of accent symbols stored in said symbol memory means simultaneously in a priority order from left to right, determined according to the frequency of use in the language corresponding to the input nationality code, so as to permit the selecting of one accent symbol for each character and the subsequent combining of accent symbols and characters input by said input means;

instruction means for instructing the selection of accent symbols for the input characters from the accent symbols displayed by said display means; and means for combining the input characters and the selected accent symbols to form accented characters on the basis of the instructing by said instructing means and for storing the accented characters in said character memory means.

22. An information processing apparatus according to claim 21, wherein said instruction means instructs the selecting of the accent symbols indicated with a cursor.

23. An information processing apparatus according to claim 21, further comprising determining means for determining whether accent symbols are displayed on the list by said display means.

24. An information processing apparatus according to claim 23, wherein said determining means determines whether the input characters are the characters to be accented with accent symbols.

25. An information processing apparatus, adapted to operate according to a key input processing main routine and according to an accent search process, comprising:

input means for inputting characters during the key input processing main routine and for inputting accent symbols during the accent search process and a nationality code;

symbol memory means for storing information representing the accent symbols;

display means for displaying the characters input by said input means and the accent symbols stored in said symbol memory means;

determining means for determining whether the input characters should be accented with accent symbols;

means for operating said apparatus according to the key input processing main routine when said determining means determines that the input characters should not be accented with accent symbols and for conducting the accent search process when said determining means determines that the input characters should be accented with accent symbols;

display control means for controlling said display means to display the accent symbols stored in said symbol storing means simultaneously in a priority order from left to right, determined according to the frequency of use in the language corresponding to the input nationality code, when said determining means determines that the input characters should be accented and after said operating means conducts the accent search process so as to permit the selecting of one accent symbol for each character and the subsequent combining of the accent symbols with the characters input by said input means; and indicating means for indicating the selection of one accent symbol for each input character from the accent symbols displayed by said display means.

26. An information processing method, adapted to operate an apparatus according to a key input processing main routine and according to an accent search process, comprising the steps of:

inputting characters and a nationality code into an information processing apparatus during the key input processing main routine;

displaying the characters inputted in said inputting step;

determining whether the input characters should be accented with accent symbols;

operating the apparatus according to the key input processing main routine when said determining step determines that the input characters should not be accented with accent symbols and for conducting the accent search process when said determining step determines that the input characters should be accented with accent symbols;

displaying a plurality of accent symbols simultaneously in a priority order form left to right, determined according to the frequency of use in the language corresponding to the input nationality code, for each character that should be accented as determined in said determining step when the apparatus operates according to the accent search process; and selecting one accent symbol from the plurality of displayed symbols for each character that should be accented and combining the selected accent symbols and their respective characters to form accented characters.

27. A medium for storing a program for a document information processing apparatus instructing the apparatus to perform a method comprising the steps of:

inputting characters of a plurality of languages, symbols relating to pronunciation of the inputted characters and associated with the input characters, selecting data, and a nationality code with operating input means;

displaying with display means proposed symbols relating to pronunciation of the inputted characters and selecting a proposed symbol to be associated with each input character in accordance with the inputting of the selecting data in combination with a character input provided by the operation of the operating input means;

storing in memory means information comprising a nationality code table, an accent combination table, and a proposed accent table, wherein the nationality code table stores nationality codes of different languages, wherein the accent combination table stores character codes of different languages corresponding to different nationality codes stored in the nationality code table, and wherein the proposed accent table stores code data of proposed symbols to be annexed to characters in each language, the code of which is stored in the nationality code table, so that the proposed symbols can be searched for in the memory means by designating one of the plurality of languages with a nationality code and an input character; and searching the nationality code table for the nationality code input by the operating input means, for searching the accent combination table for a character code corresponding to an input character in the language corresponding to the input nationality code, and for searching the proposed accent table for information on proposed symbols for the input character in the language corresponding to the input nationality code previously input by the operating input means, for controlling the display means to display proposed symbols represented by the searched information, and for storing accented character codes, each representing an inputted character and a proposed symbol selected to be associated therewith in accordance with the inputting of the selecting data in combination with a character input by the operating input means.

28. A medium for storing a program for a document information processing apparatus instructing the apparatus to perform a method comprising the steps of:

inputting alphabetical characters in response to an operator operating at least alphabetic character input keys of operating input means and inputting and selecting one of a plurality of predetermined proposed symbols relating to the pronunciation of the input alphabetical characters to associate one of the plurality of predetermined symbols with one of the alphabetical characters in response to an operator operating a selection key of the operating input means;

storing in memory means information comprising a nationality code table, an accent combination table, and a proposed accent table, wherein the nationality code table stores nationality codes of different languages, wherein the accent combination table stores character codes of different languages corresponding to different nationality codes stored in the nationality code table, and wherein the proposed accent table stores code data of proposed symbols to be annexed to alphabetical characters in each language, the code of which is stored in the nationality code table;

displaying with display means the information on proposed symbols corresponding to code data stored by the proposed accent table; and controlling the display means to display proposed symbols corresponding to code data stored in the proposed accent table for an alphabetical character input by the operating input means in a particular language whose code is stored in the nationality code table, and to display the input alphabetical character and one of the proposed symbols together, in response to an operator operating the selection key to select one of the proposed symbols of the plurality of predetermined symbols to be associated with the alphabetical character.

29. A medium for storing a program for an information processing apparatus instructing the apparatus to perform a method comprising the steps of:

inputting characters of languages of a plurality of countries and accent symbols;

displaying with display means the input characters input by said input step and proposed accent symbols;

storing in symbol memory means information representing proposed accent symbols of languages of a plurality of countries to be displayed by said displaying steps, the symbol memory means comprising a proposed accent table;

determining with determining means the countries whose languages the input characters belong to so as to permit the display of proposed accent symbols of a language of a country whose language the input characters belong to, the determining means comprising a nationality code table storing nationality codes of different languages and an accent combination table storing character codes of different languages corresponding to the different nationality codes stored in the nationality code table;

controlling the display means to display proposed accent symbols for each character after searching the nationality code table for a nationality code of the language to which the input character belongs, after searching the accent combination table for a character code of the language corresponding to the searched nationality code, and after searching the proposed accent table for proposed accent symbols corresponding to the searched character code in the accent combination table, the proposed accent symbols for one character relating to a language of a country whose language the one character belongs to as determined by said determining means; and instructing the selections of a proposed accent symbol for each character from the proposed accent symbols displayed by the display means.

\* \* \* \* \*

UNITED STATES PATENT AND TRADEMARK OFFICE
CERTIFICATE OF CORRECTION

PATENT NO. : 5,623,682
DATED : April 22, 1997
INVENTOR(S) : KOJI FUKUNAGA

It is certified that error appears in the above-identified patent and that said Letters Patent is hereby corrected as shown below:

ON COVER PAGE:

At [56] Under Heading "U.S. PATENT DOCUMENTS":

Line 1, "Kubnak" should read --Kubinak--.

COLUMN 2:
Line 42, "symbol's" should read --symbols--.

COLUMN 9:
Line 25, "sill" should read --skill--.

Signed and Sealed this

Twenty-fifth Day of November, 1997

Attest:

BRUCE LEHMAN

Attesting Officer

Commissioner of Patents and Trademarks